(12) United States Patent
Levin (10) Patent No.: US 7,245,202 B2
(45) Date of Patent: Jul. 17, 2007

(54) SYSTEMS AND METHODS FOR NETWORKED HAPTIC DEVICES

(75) Inventor: Michael D. Levin, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 299 days.

(21) Appl. No.: 10/938,492

(22) Filed: Sep. 10, 2004

(65) Prior Publication Data
US 2006/0059241 A1 Mar. 16, 2006

(51) Int. Cl.
*H04B 3/36* (2006.01)

(52) U.S. Cl. .................... 340/407.1; 307/114; 345/184

(58) Field of Classification Search ............. 340/407.1, 340/540, 644, 825.19; 345/156, 184; 600/552, 600/557; 307/112–114, 116, 119, 125
See application file for complete search history.

(56) References Cited

U.S. PATENT DOCUMENTS

| 3,157,853 A | 11/1964 | Hirsch |
| 3,220,121 A | 11/1965 | Cutler |
| 3,497,668 A | 2/1970 | Hirsch |
| 3,517,446 A | 6/1970 | Carlyon et al. |
| 3,902,687 A | 6/1973 | Hightower |
| 3,903,614 A | 9/1975 | Diamond et al. |
| 4,160,508 A | 7/1979 | Salsbury |
| 4,236,325 A | 12/1980 | Hall et al. |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | De Vries et al. |
| 4,713,007 A | 12/1987 | Alban |
| 4,891,764 A | 1/1990 | McIntosh |
| 4,930,770 A | 6/1990 | Baker |
| 4,934,694 A | 6/1990 | McIntosh |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,186,695 A | 2/1993 | Mangseth et al. |
| 5,212,473 A | 5/1993 | Louis |
| 5,240,417 A | 8/1993 | Smithson et al. |

(Continued)

FOREIGN PATENT DOCUMENTS

EP 0349086 1/1990

(Continued)

OTHER PUBLICATIONS

Adelstein, "A Virtual Environment System For The Study of Human Arm Tremor," Ph.D. Dissertation, Dept. of Mechanical Engineering, MIT, Jun. 1989.

(Continued)

*Primary Examiner*—Thomas Mullen
(74) *Attorney, Agent, or Firm*—Kilpatrick Stockton LLP (57) ABSTRACT

Systems and methods for haptic devices are described. One described method comprises receiving a first input signal from a first control node and generating an output signal configured to administer a haptic effect on a second control node that is based at least in part on the first input signal.

33 Claims, 8 Drawing Sheets

U.S. PATENT DOCUMENTS

| | | | |
|---|---|---|---|
| 5,271,290 | A | 12/1993 | Fischer |
| 5,275,174 | A | 1/1994 | Cook |
| 5,299,810 | A | 4/1994 | Pierce |
| 5,309,140 | A | 5/1994 | Everett |
| 5,334,027 | A | 8/1994 | Wherlock |
| 5,466,213 | A | 11/1995 | Hogan |
| 5,547,382 | A | 8/1996 | Yamasaki |
| 5,766,016 | A | 6/1998 | Sinclair |
| 5,785,630 | A | 7/1998 | Bobick et al. |
| 6,111,577 | A | 8/2000 | Zilles et al. |
| 6,140,987 | A * | 10/2000 | Stein et al. .................. 345/173 |
| 6,219,034 | B1 | 4/2001 | Elbing et al. |
| 6,422,941 | B1 | 7/2002 | Thorner et al. |
| 6,998,984 | B1 * | 2/2006 | Zittrain et al. ........... 340/573.1 |

FOREIGN PATENT DOCUMENTS

| | | |
|---|---|---|
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

Bejczy, et al., "Universal Computer Control System (UCCS) For Space Telerobots," CH2413-3/87/0000/0318501.00 1987 IEEE, 1987.

Bejczy et al., "A Laboratory Breadboard System For Dual-Arm Teleoperation," SOAR '89 Workshop, JSC, Houston, TX, Jul. 25-27, 1989.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

"Cyberman Technical Specification," Logitech Cyberman SWIFT Supplement, Apr. 5, 1994.

Eberhardt et al., "OMAR—A Haptic display for speech perception by deaf and deaf-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen -based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display." Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," 2nd Edition: McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride," Computer Currents. Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348. pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

* cited by examiner

SYSTEMS AND METHODS FOR NETWORKED HAPTIC DEVICES

FIELD OF THE INVENTION

The present invention generally relates to haptic systems and methods. The present invention more particularly relates to systems and methods for networked haptic devices.

BACKGROUND

Some conventional buttons, sliders, dials and other controls provide haptic feedback to a user. Such devices may provide a user with system status information. For example, an input device, such as a linear slider with minimum and maximum stops at each end, can communicate to a user the speed of an assembly line without the user having to actually observe the assembly line. When the slider is at a minimum stop, the assembly line is at its slowest speed; when at the maximum stop, the assembly line is at the fastest speed. The stops may be fixed during construction of the device or may be implemented with an actuator.

A single system may utilize a plurality of input devices to control the system. Each input device can serve as an individual control node that has the ability to control a function of the system. Typically, the input devices are located at various positions around the corresponding system for convenient interfacing with a system user.

For example, a room may have two doorways with a light switch adjacent to each doorway. As another example, an audio-visual component, such as a television, may have a volume or channel selector on the faceplate of the component and on a remote control. As still another example, a manufacturing line may have several start/stop switches. As yet another example, a security or fire alarm system may have an access panel near each of several entrances. When multiple nodes are present to control the same function of a system, a problem may arise when a user changes the setting for that function at one control node and the remaining control nodes do not reflect the change in the setting.

SUMMARY

Embodiments of the present invention include systems and methods for networked haptic devices. An apparatus according to one embodiment of the present invention comprises a first master control node operable to receive a first input signal from a first control node and generate a first output signal configured to produce a first haptic effect on a second control node. The first haptic effect is associated at least in part with the first input signal.

Another embodiment of the present invention implements a method comprising receiving an input signal from a first control node and generating an output signal configured to produce a haptic effect on a second control node. The haptic effect may be based in part on the first input signal.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
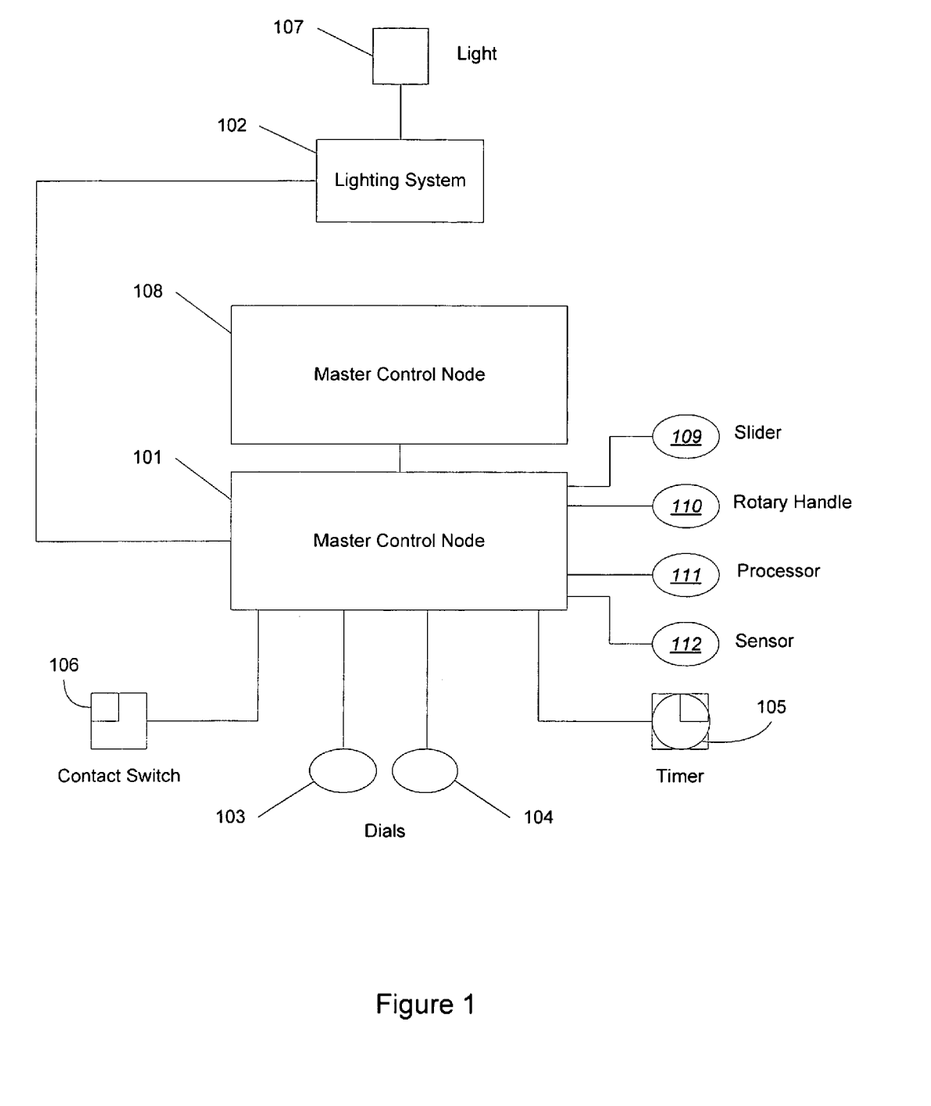
FIG. 1 is an illustration of an environment for implementation of one embodiment of the present invention.

Embodiments of the present invention include systems and methods for networked haptic devices. Referring now to the drawings in which like numerals indicate like elements throughout the several figures, FIG. 1 illustrates an environment for implementation of one embodiment of the present invention. The embodiment shown in FIG. 1 comprises an apparatus for controlling a light 107 of a lighting system 102. A lighting system 102 may comprise circuitry and apparatus for providing electrical current to a light 107. In other embodiments, the environment displayed in FIG. 1 may comprise apparatus for controlling a single function or multiple functions of other types of systems.

The apparatus in FIG. 1 comprises a first master control node 101 in communication with peripheral control nodes 103, 104, 105, 106 and a lighting system 102, which comprises a light 107. The first master control node comprises a device capable of receiving and generating signals for communication with the lighting system 102 and the peripheral control nodes 103, 104, 105, and 106. The first master control node 101 may receive a first input signal from a first peripheral control node and generate a first output signal configured to produce a first haptic effect on a second control node that is associated at least in part with the first input signal. Devices suitable for a first master control node may comprise, for example, any device that includes or may access a processor, including a computer, dedicated controller, or any other processor-equipped device.

Suitable processors may include, for example, digital logic processors capable of processing input, executing algorithms, and generating output as necessary. Such processors may include a microprocessor, an ASIC, and state machines. Such processors include, or may be in communication with media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as a processor in communication with a touch-sensitive input or control device, with computer-readable instructions. Other examples of suitable media include, but are not limited to, a floppy disk, CD-ROM, magnetic disc, memory chip, ROM, RAM, an ASIC, a configured processor, all optical media, all magnetic tape or other magnetic media, or any other medium from which a computer processor can read instructions. Also, various forms of computer-readable media may transmit or carry instructions to a computer, including a router, private or public network, or other transmission device or channel both wired and wireless. The instructions may comprise code from any suitable computer-programming language, including, for example, C, C++, C#, Visual Basic, Java, and JavaScript.

The peripheral control nodes 103, 104, 105, and 106 comprise input devices for controlling the light 107 of the lighting system 102. The term "peripheral" is used to further differentiate user input control nodes from a master control node. Moreover, the use of "peripheral" is not intended to define the physical location or rank the importance of the objects this term modifies throughout this document. In other embodiments, peripheral control nodes can comprise input devices for controlling a plurality of functions of a system wherein the system can comprise one or a plurality of systems. In the embodiment shown in FIG. 1, peripheral control nodes 103, 104 comprise dials for altering the intensity of the light 107. The dials shown 103, 104 have a push-on feature and a set of regularly spaced detents as they are rotated from the minimum to the maximum setting with stops at each end. These detents and stops are haptic cues, which are based on software settings and may be produced, for example, by actuators.

Peripheral control node 105 comprises a timer, while peripheral control node 106 comprises a contact switch. The timer 105 is able to turn the light 107 of the lighting system 102 on and off at various times while the contact switch can be flipped by a user to turn the light 107 on and off. The peripheral control nodes can be located at different positions around the lighting system 102, allowing a user to control the system from various locations. For example, a peripheral control node may be located adjacent to each doorway of a room in which the lighting system 102 is located.

The dial of peripheral control node 103 or 104, the timer of peripheral control node 105, or the contact switch of peripheral control node 106 may serve as a first control node for producing a first input signal and transmitting the produced signal to the master control node 101. In other embodiments, the first control node can comprise a manipulandum wherein the manipulandum can comprise at least one of a slider and rotary handle. The first control node may additionally comprise a processor.

A peripheral control node capable of providing haptic feedback to a user may serve as a second control node in embodiments of the present invention. The second peripheral control node may comprise one or a plurality of control nodes capable of providing haptic feedback to a user. In the apparatus shown in FIG. 1, peripheral control nodes 103, 104 comprising dials may serve as second control nodes. In other embodiments, the second control node may comprise a manipulandum comprising at least one of a slider 109 and rotary handle 110. The second control node may additionally comprise a processor 111 or a sensor 112.

Still referring to FIG. 1, the first master control node 101 may be in communication with a second master control node 108, wherein the second master control node is operable to receive the first output signal generated by the first master control node. Devices suitable for use as a second master control node are consistent with those described as being suitable for use as a first master control node.

The second master control node may be additionally operable to generate a second output signal configured to produce a second haptic effect on a third control node that is associated at least in part with the first output signal. A third control node may comprise one or a plurality of peripheral control nodes capable of providing haptic feedback to a user.

In still another embodiment of the present invention, an apparatus comprises a first control node operable to generate an input signal configured to cause a master control node to generate an output signal wherein the output signal is configured to produce a haptic effect on a second control node that is associated at least in part with the input signal. The properties and characteristics of the first control node and master control node are consistent with those described for the first control node and first master control node of the embodiment described in relation to FIG. 1.

In another embodiment of the present invention, an apparatus comprises a first control node comprising a sensor and a second control node, wherein the first control node is operable to sense input at the first control node and generate an output signal configured to produce a haptic effect on the second control node that is based at least in part on the sensed input. The sensor of the first control node, for example, may be operable to sense rotational motion of the first control node when a user turns the first control node to alter a function of a system. The properties and characteristics of the first control node and second control node are consistent with those described for the first control node and second control node of the embodiment described in relation to FIG. 1.

A method according to the present invention, may comprise receiving a first input signal from a first control node and generating an output signal configured to produce a haptic effect on the second control node that is based at least in part on the first input signal.

Referring still to FIG. 1, the master control node 101 may receive an input signal from a first control node 103. The master control node 101 may subsequently generate an output signal configured to generate a haptic effect on a second control node 104. This output signal may be based at least in part on the information contained in the input signal generated at the first control node 103.

Figure 2:
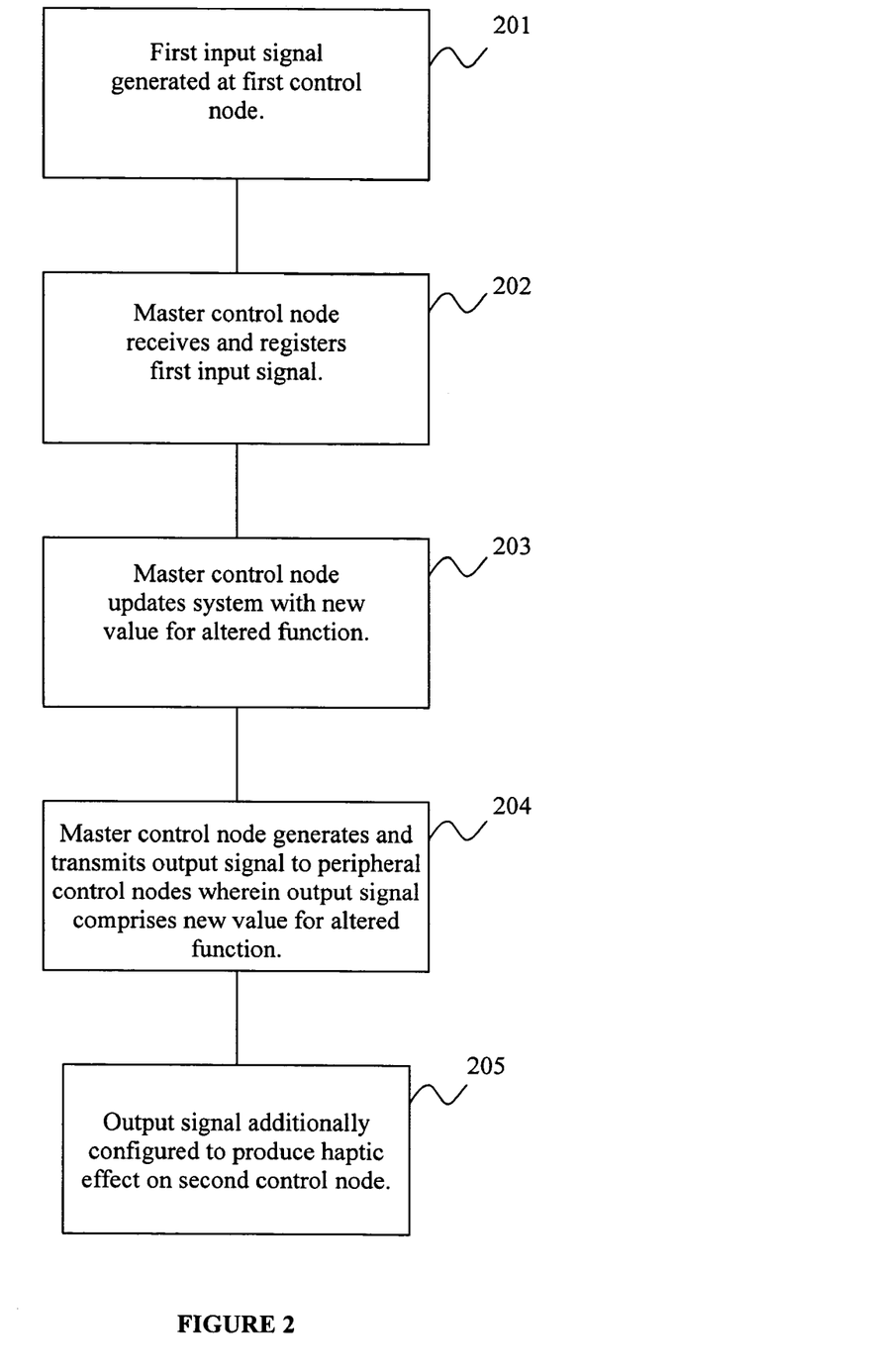
FIG. 2 is a flowchart illustrating a process for synchronizing the haptic feedback of peripheral control nodes according to one embodiment of the present invention.

FIG. 2 is a flowchart illustrating a method for synchronizing the haptic feedback of peripheral control nodes according to one embodiment of the present invention. The process illustrated in FIG. 2 is described with reference to the environment of the lighting system 102 of FIG. 1, but methods according to the present invention are not limited to such an environment.

In the embodiment shown in FIG. 1, a user can alter the light intensity of the lighting system (102) at any first peripheral control node (103, 104, 105, 106). For example, the user can turn the dial of first peripheral control node (103) located at one doorway to increase the light intensity. Referring to FIG. 2, when the user turns the dial of first control node (103) to increase the light intensity, a first input signal is generated at the first control node 201. This first input signal may comprise a sensor signal wherein the sensor signal can be correlated with a change in current for the lighting system (102). In embodiments of the present invention, the sensor signal may be incremental. The sensor signal, for example, may change by +/−1, 5, 10, 100, etc. In other embodiments the sensor signal may be absolute in that function being altered is either at a maximum or off.

The first input signal is transmitted to the master control node (101). The master control node (101) receives and registers the first input signal from first control node (103) 202. When registering the first input signal, the master control node (101) assigns a value to the first input signal. The value assigned to the first input signal comprises the new master light intensity value for the lighting system (102). As used herein, the "master value" in embodiments of the present invention need not signify an actual parameter such as current. It may be any value in a range that represents a control point such as 1–10 or 1–100.

The master control node (101) updates the lighting system (102) with the new master light intensity value 203. This may be accomplished in any suitable manner. In the embodiment shown, the master control node (101) updates the lighting system (102) by altering the current reaching the lighting system (102) to reflect the current associated with the sensor signal. In the present embodiment, the intensity of the light (107) increases.

In other embodiments, the first input signal may be generated at the first control node by a data output device such as a processor or infrared emission source. The data output device transmits the first input signal comprising a data packet to the master control node (101). The data packet contains information comprising a new value for the current reaching the lighting system (102). The master control node (101) registers the new value for the current and updates the light (107) by altering the current reaching the lighting system (102) to reflect the new value for the current contained in the data package.

In addition to updating the lighting system (102) with the new master value for light intensity 203, the master control node (101) sends an output signal to each peripheral control node with the new master value for the light intensity of the lighting system (102) 204. The embodiment shown sends the output signal to peripheral control nodes besides the one receiving user input that initiated the change. The processor of the master control node (101) generates an output signal containing the new master light intensity value and sends the output signal to the appropriate peripheral control node or nodes. The peripheral control nodes may store the new master value for the light intensity in their local memory (not shown). The master control node (101) may communicate with the various peripheral control nodes to determine which ones have not received user input. In the present embodiment, peripheral control nodes (104), (105), and (106) receive this new master value. As a result, every peripheral control node exhibits the same internal value for the light intensity of the lighting system (102).

In other embodiments, some or all of the peripheral control nodes do not have the capability to store the new master value for the light intensity. In one such embodiment, the new master value for light intensity is stored at the master control node (101). Each peripheral control node receives the new master value from the master control node (101) when a user interfaces with the peripheral control node to further alter the intensity of the lighting system (102).

The output signal containing the new master value for the light intensity generated by the master control node (101) is configured to generate a haptic effect on a second control node receiving the output signal wherein the haptic effect is based at least in part on the first input signal 205. A second control node can comprise one or a plurality of peripheral control nodes capable of producing haptic feedback. In the lighting system of FIG. 1, for example, a second control node can comprise peripheral control node (104).

In embodiments where the master control node sends the output signal to a second peripheral control node not receiving user input, the second peripheral control node is altered to haptically reflect the current status of the system. For example, a user can turn the dial of peripheral control node (103) to the maximum stop to increase the light intensity of the light (107). The corresponding input signal sent to the master control node (101) contains information that peripheral control node (103) is at the maximum stop. The subsequent output signal generated by the master control node (101) and sent to second peripheral control node (104) contains information consistent with that of the first input signal indicating that control node (103) is at the maximum stop. The output signal causes the dial of second control node (104) to haptically reflect the maximum stop position.

The dial of second peripheral control node (104) does not physically move to the maximum stop position upon receiving the output signal from the master control node (101). Instead, the haptic workspace around the dial is altered to reflect the maximum stop position. Software controlled actuators responsible for producing the haptic cues of the dial alter the haptic workspace of peripheral control node (104), allowing it to reflect the maximum stop position. As a result, when a user subsequently interfaces with second control node (104) to further alter the light intensity of the lighting system 102, the dial of control node (104) is at the maximum stop, which is consistent with the haptic position of the dial of control node (103). In other embodiments, the dial of second peripheral control node (104) may physically move. The dial (104), for example, may have a pointer which needs realignment to reflect the current functional status of the system after alteration by a system user.

In embodiments in which the new master value for the light intensity is stored at the master control node 101 and not at the peripheral control nodes, a second input signal can be generated at the second control node upon interfacing with a user. For example, when a user subsequently turns the dial of a second peripheral control node 104 located at a different doorway from control node 103 to further alter the light intensity, a second input signal may be generated. The second input signal may be generated in a manner that is substantially similar to the generation of the first input signal. The second input signal is transmitted to the master control node 101. The master control node 101 receives this second input signal originating from the second control node 104. After receipt of this second input signal, the master control node 101 transmits the output signal to second control node 104. This output signal is configured to produce a haptic effect on second control node 104 that is based at least in part on the first user input signal originating at first control node 103.

The output signal produces a haptic effect on second peripheral control node 104 allowing it to reflect the haptic position of control node 103. In one embodiment, the dial of peripheral control node 104 does not physically move to the maximum stop position upon receiving the output signal from the master control node 101. Instead, the haptic workspace around the dial is altered to reflect the maximum stop position. Software controlled actuators responsible for producing the haptic cues of the dial alter the haptic workspace of peripheral control node 104, allowing it to reflect a position consistent with that of control node 103. As a result, the software controlled actuators of control nodes 103 and 104 are synchronized allowing the dials comprising the nodes to reflect consistent positions to a user.

Figure 3:
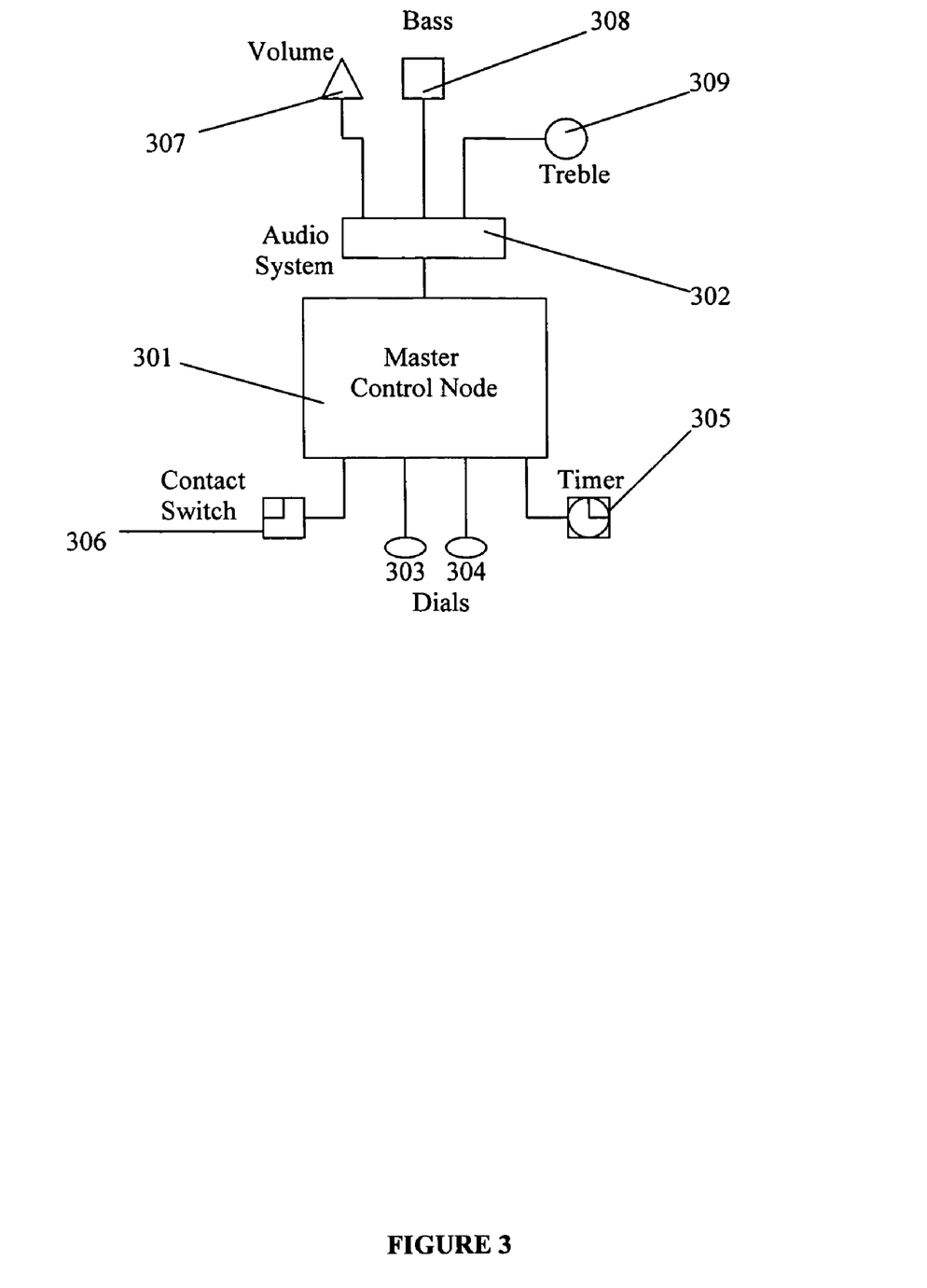
FIG. 3 is an illustration of an environment for implementation of another embodiment of the present invention.

FIG. 3 is an illustration of an environment for implementation of another embodiment of the present invention. The environment illustrated is an audio system 302 that comprises the functions for volume 307, bass 308, and treble 309. In further embodiments, the environment of FIG. 3 may be various individual systems that comprise multiple functions.

Peripheral control nodes 303, 304, 305, 306 comprise input devices for controlling the volume 307, bass 308, and treble 309 functions of the audio system 302. Specifically, peripheral control nodes 303 and 304 comprise dials as described in relation to FIG. 1, the control node 305 comprises a timer and control node 306 is a contact switch. The peripheral control nodes 303, 304, 305, 306 are placed at different positions around the system allowing a user a variety of locations from which to control the system. For example, the peripheral control nodes can be both on the faceplate component of the audio system as well as on a remote control.

The audio system 302 and peripheral control nodes 303, 304, 305, 306 are connected to a master control node 301. The master control node 301 comprises a device capable of receiving and generating signals for communication with the audio system 302 and peripheral control nodes 303, 304, 305, 306. The master control node 301 receives user input signals from peripheral control nodes 303, 304, 305, 306 and subsequently outputs signals configured to generate haptic feedback at the peripheral control nodes 303, 304, 305, 306. Devices suitable for a master control node 301 can comprise any device that includes a processor, including a computer, dedicated controller, or any other processor equipped device. The characteristics and capabilities of these devices are similar to the devices suitable for serving as the master control node in the preceding lighting system example of FIG. 1.

Figure 4:
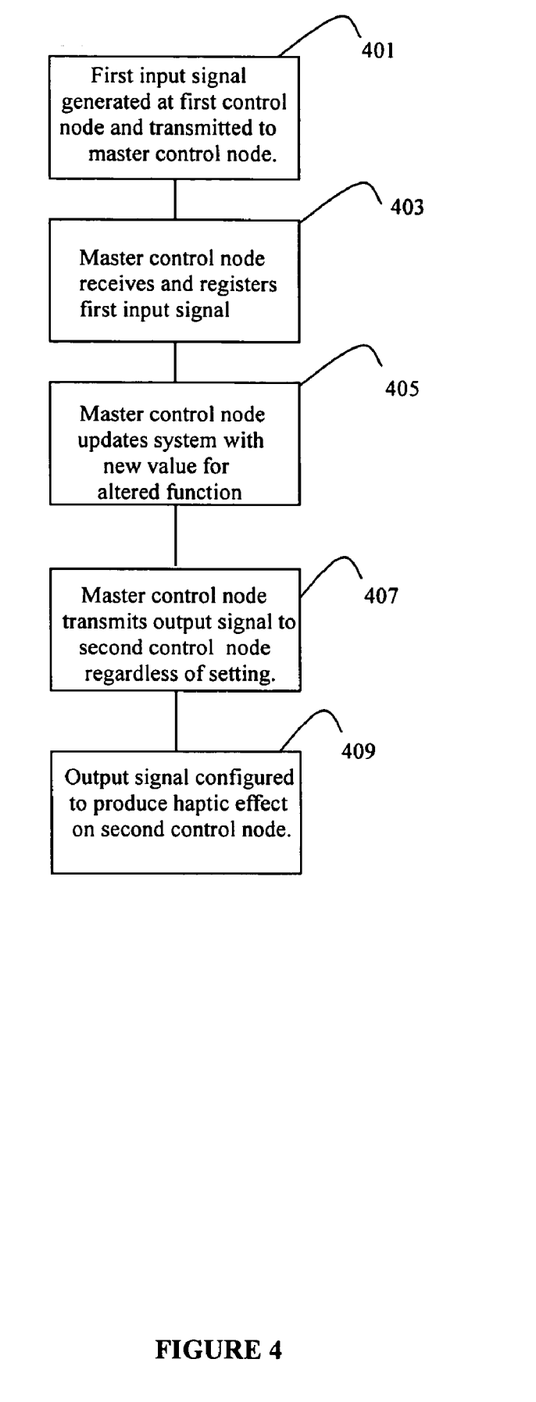
FIG. 4 is a flowchart illustrating a process for synchronizing the haptic feedback of peripheral control nodes according to one embodiment of the present invention.

FIG. 4 is a flowchart illustrating a process for synchronizing the haptic feedback of peripheral control nodes according to one embodiment of the present invention. The process illustrated in FIG. 4 is described with reference to the environment of the audio system 302 of FIG. 3.

In the embodiment of FIG. 3, a user can alter the volume (307), bass (308), and treble (309) functions of the audio system (302) at any first peripheral control node (303, 304, 305, 306). For example, a user depresses the dial of first control node (303) located on the faceplate of an audio system (302) to toggle through the volume (307), bass (308) and treble (309) functions. When the user sets first peripheral control node (303) to the bass (308) function, the other peripheral control nodes remain set to their current function and do not change to the bass (308) function. The user turns the dial of control node (303) to the minimum stop to minimize the bass frequencies coming through the speakers of the audio system (302). When the user turns the dial of first control node (303) to reduce the bass in the system, a first input signal is generated at first control node (303) and transmitted to the master control node (301) 401. The master control node (301) receives and registers the first input signal 403 and subsequently updates the audio system (302) with the new value for the bass (308) function by reducing the bass coming out of the speakers 405.

In addition, the master control node (301) sends an output signal to each peripheral control node not receiving user input with the new master value for the bass (308) function of the audio system (302). The master control node (301) may send the new master value for the bass (308) function to these peripheral control nodes regardless of their functional setting in the present multiple function system 407.

The processor of the master control node generates the output signal and transmits it to the appropriate peripheral control nodes. The peripheral control nodes store the new master value for the bass function (308) in their local memory (not shown). The master control node communicates with the various peripheral control nodes to determine which ones have not received user input. In the present embodiment, peripheral control nodes (304), (305), and (306) receive this new master value.

Figure 5:
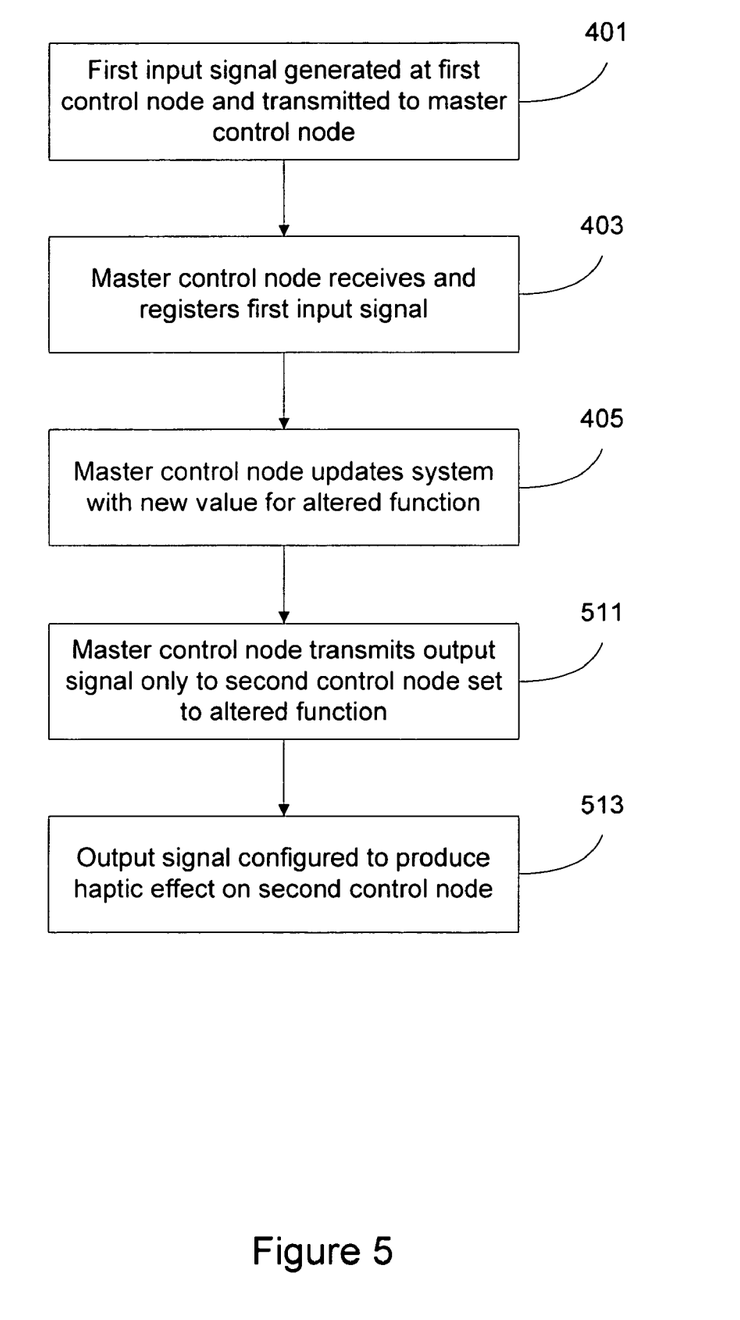
FIG. 5 is a flowchart illustrating a process for synchronizing the haptic feedback of peripheral control nodes according to one embodiment of the present invention.

Alternatively, as shown in FIG. 5, which is a flowchart for synchronizing the haptic feedback of peripheral control nodes according to one embodiment of the present invention, the master control node may send the new master value only to those control nodes that are currently set to the function being altered in a multiple function system. For example, when the user alters the bass (308) function, the master control node (301) automatically sends the new master value only to those peripheral control nodes not receiving user input that are also set to the bass (308) function 511.

Figure 6:
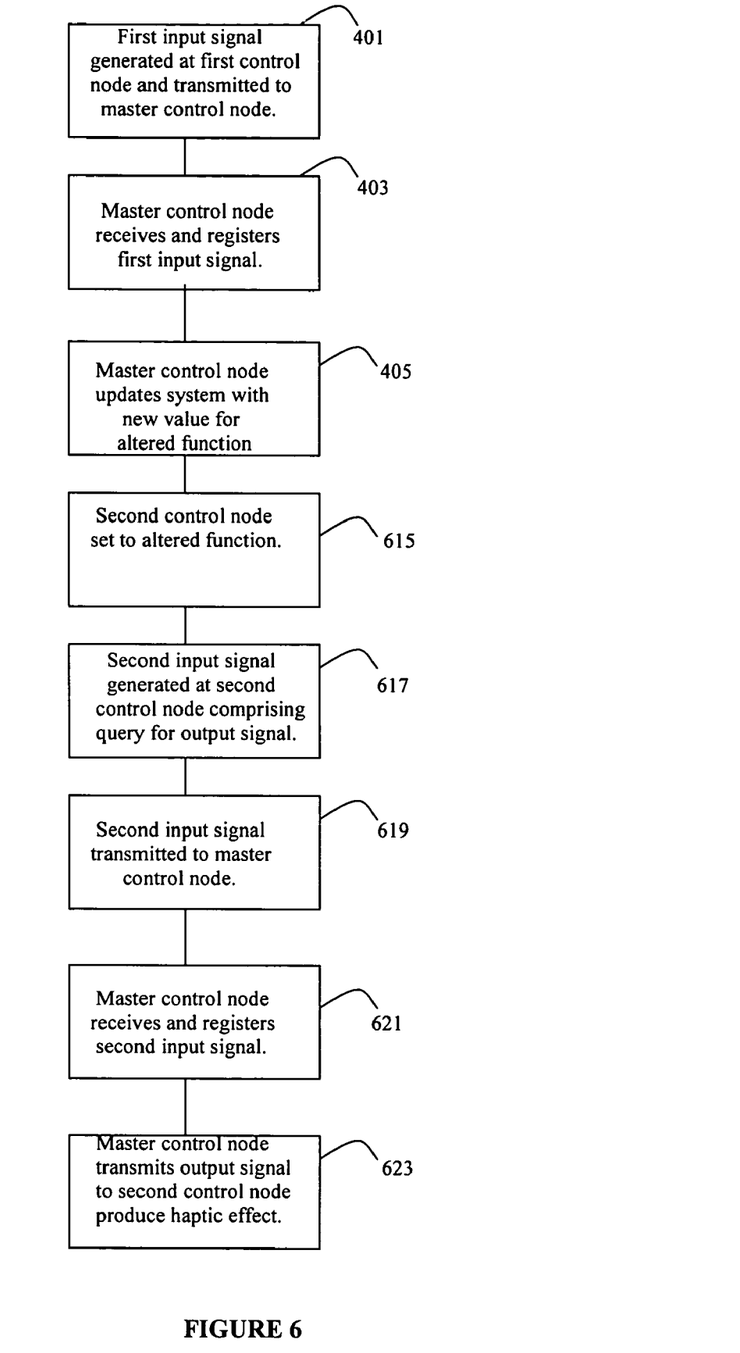
FIG. 6 is a flowchart illustrating a process for synchronizing the haptic feedback of peripheral control nodes according to one embodiment of the present invention.

In another embodiment, as shown in FIG. 6, which is a flowchart illustrating a process for synchronizing the haptic feedback of peripheral control nodes according to an embodiment of the present invention, the peripheral control nodes that are not set to the bass (308) function may query the master node to receive the new master value when subsequently set to the bass (308) function 615.

The output signal containing the new master value for the bass function (308) generated by the master control node (301) is configured to generate a haptic effect on a second control node receiving the output signal wherein the haptic effect is based at least in part on the input signal originating from the first control node (303). As previously described, a second control node can comprise one or a plurality of peripheral control nodes capable of providing haptic feedback to a system user. In the audio system (302) of FIG. 3, a second control node can comprise peripheral control node (304).

Referring again to FIG. 4, in embodiments where the master control node sends the output signal to a second peripheral control node not receiving user input regardless of the second control node's functional status 407, the second peripheral control node (304) is altered to haptically reflect the current status of the bass function (308) when set to the bass function (308). When a user turns the dial of first peripheral control node (303) to the minimum stop to minimize any bass coming through the speakers, a first input signal is generated and sent to the master control node 403. The first input signal sent to the master control node (301) contains information that peripheral control node (303) is at the minimum stop. The subsequent output signal generated by the master control node (301) and sent to second peripheral control node (304) 407 contains information consistent with that of the first input signal indicating that control node (303) is at the minimum stop. The output signal is configured to cause the dial of second control node (304) to haptically reflect the minimum stop position 409.

The dial of second peripheral control node (304) does not physically move to the minimum stop position upon receiving the output signal from the master control node (301). Instead, the haptic workspace around the dial is altered to reflect the minimum stop position. Software-dependent actuators responsible for producing the haptic cues of the dial alter the haptic workspace of second peripheral control node (304) allowing it to reflect the minimum stop position. As a result, when a user subsequently interfaces with second control node (304) to further alter the bass function (308) of the audio system (302), the dial of control node (304) is at the minimum stop, which is consistent with the haptic position of the dial of control node (103).

Referring now to FIG. 5, in embodiments in which the master control node sends the output signal only to those control nodes currently set to the function being altered in a multiple function system 511, a second peripheral control node (304) receiving the output signal is altered to haptically reflect the current status of the bass function (308) 513. The second peripheral control node of the present embodiment is altered in a manner consistent with that described in the preceding embodiment.

Referring now to FIG. 6, in embodiments in which a peripheral control node may query the master control node to receive the new master value for the altered function, a second input signal may be generated at a second control node when a user sets the second control node to the altered function 615, 617. A user may depress the dial of second peripheral control node (304) to toggle from the treble (309) or volume (307) functions to the bass (308) function. When second peripheral control node (304) is set to the bass (308) function, a second input signal is generated 617. The second input signal may comprise a query requesting that the master control node (304) update the second control node (304) with the current master value for the bass function (308) of the audio system (302). The second input signal is transmitted to the master control node (301) 619. The master control node (301) receives and registers this second input signal originating from the second control node (304) 621. After receipt and registry of this second input signal, the master control node (301) transmits the output signal to second control node (304) 623. This output signal contains the new master value for the bass (308) function. The output signal is configured to produce a haptic effect on second control node (304), the haptic effect based at least in part on the first input signal originating at first control node (303) 623.

The output signal produces a haptic effect on second peripheral control node (304) allowing it to reflect the haptic position of control node (303). The dial of second peripheral control node (304) does not physically move to the minimum stop position upon receiving the output signal from the master control node (301). Instead the haptic workspace around the dial is altered to reflect the minimum position. Software controlled actuators responsible for producing the haptic cues of the dial alter the haptic workspace of second peripheral control node (304), allowing it to reflect a position consistent with that of control node (303). As a result, the software controlled actuators of control nodes (303) and (304) are synchronized allowing the dials comprising the nodes to reflect consistent positions to a user.

These embodiments of the present invention allow a user to determine the functional status of a multiple function system through the haptic feedback of synchronized peripheral control nodes. Furthermore, the method of synchronizing the peripheral control nodes is the same when a system user alters more than one function of a multiple function system.

Figure 7:
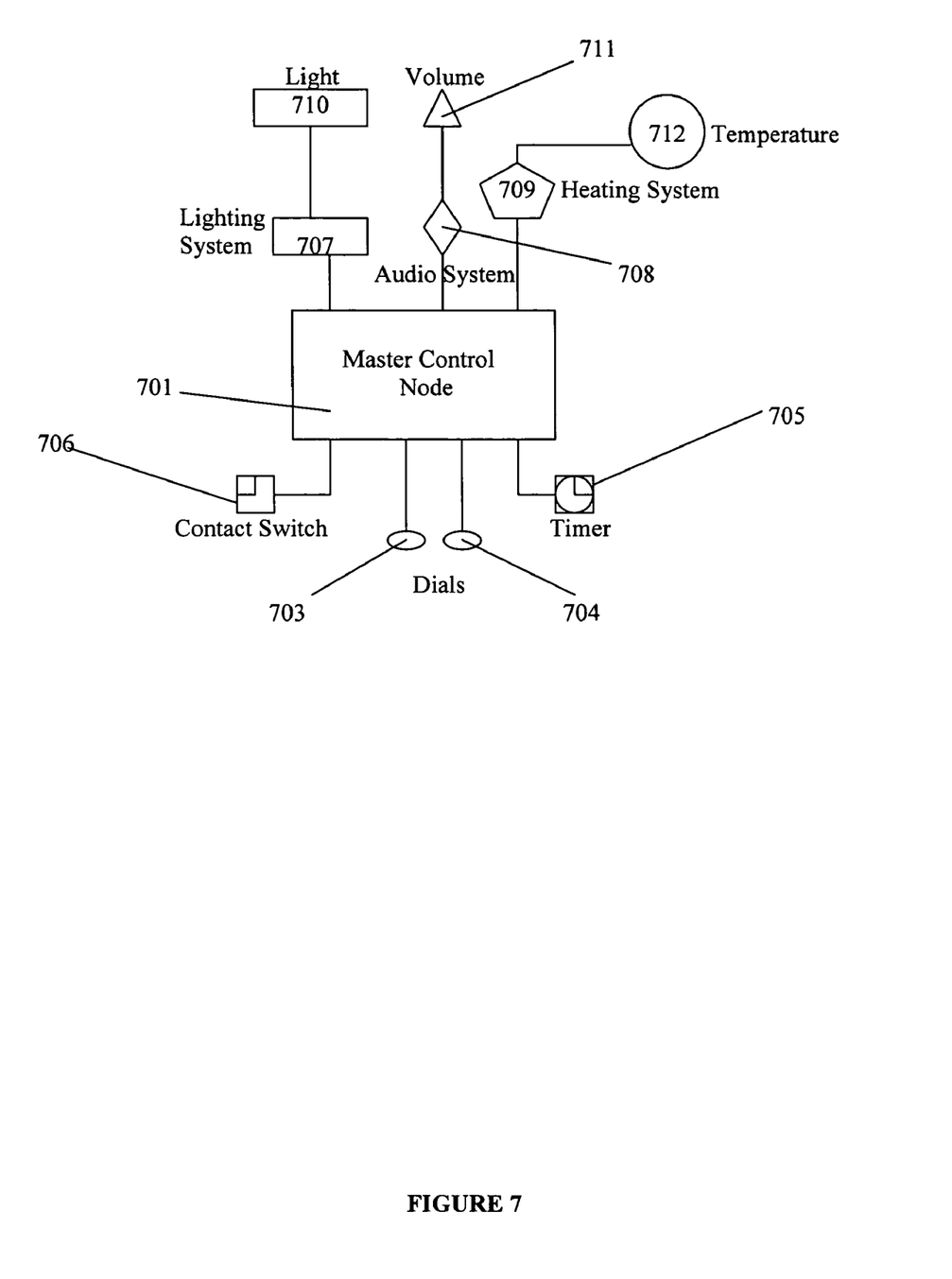
FIG. 7 is an illustration of an environment for implementation of a further embodiment of the present invention.

FIG. 7 is an illustration of an environment for implementation of a further embodiment of the present invention. The environment displayed comprises a lighting system 707 with a light 710, an audio system 708 with a volume function 711, and heating system 709 with a temperature function 712. In further embodiments, the environment of FIG. 7 can comprise multiple independent systems each comprising a single function.

Peripheral control nodes 703, 704, 705, 706 are input devices for controlling the light 710 of the lighting system 707, the volume 711 of the audio system 708, and the temperature 712 of the heating system 709. These peripheral control nodes 703, 704, 705, 706 are consistent with those described in the preceding embodiments of FIGS. 1 and 3. The peripheral control nodes 703, 704, 705, 706 are located at different positions around the systems allowing a user a variety of locations from which to control the systems. For example, in this embodiment, the control nodes are located throughout various rooms in a house.

The lighting 707, audio 708, and heating 709 systems along with peripheral control nodes 703, 704, 705, 706 are connected to a master control node 701. The master control node 701 comprises a device capable of receiving and generating signals for communication with the lighting 707, audio 708, and heating 709 systems and peripheral control nodes 703, 704, 705, 706. The master control node 701 receives user input signals from peripheral control nodes 703, 704, 705, 706 and subsequently outputs signals configured to generate haptic feedback at the peripheral control nodes 703, 704, 705, 706. Devices suitable for a master control node 701 can comprise any device that includes a processor, including a computer, dedicated controller, or any other processor equipped device. The characteristics and capabilities of these devices are similar to the devices suitable for serving as the master control node in the preceding embodiments of FIGS. 1 and 3.

In the embodiment of FIG. 7, a user can select and alter the lighting 707, audio 708, and heating 709 systems at any first peripheral control node 703, 704, 705, 706. For example, a user depresses the dial of first control node 703 located in the living room of a house to toggle through the lighting 707, audio 708, and heating 709 systems. When the user sets first peripheral control node 703 to the heating system 709, the other peripheral control nodes remain set to their current system and do not change to the heating system 709. The user turns the dial of first control node 703 to the maximum stop to increase the temperature function 712 of the heating system 709. When the user turns the dial of peripheral first control node 703 to increase the temperature set point, a first input signal is generated at this control node and sent to the master control node 701. The first input signal can comprise a sensor signal wherein the sensor signal can be correlated with a change in temperature set point for the temperature function 712. The first input signal is transmitted to the master control node 701. The master control node 701 receives and registers the first input signal. When registering the first input signal, the master control node 701 assigns a value to the sensor signal contained in the first input signal. The value assigned to the sensor signal comprises the new master value for the temperature function 712. The master control node subsequently updates the heating 709 system with the new value for the temperature function 712 by altering the temperature set point of the heating system 709 to reflect the temperature set point value associated with the sensor signal.

In addition, the master control node 701 sends a signal to each peripheral control node not receiving user input with the new master value for the temperature 712 function of the heating 709 system. The master control node 701 may send the new master value for the temperature 712 function of the heating 709 system to these control nodes regardless of their system setting in this multiple system environment. The processor of the master control node 701 generates the output signal and transmits it to the appropriate peripheral control nodes. The peripheral control nodes store the new master value for the temperature 712 function in their local memory. The master control node communicates with the various peripheral control nodes to determine which ones have not received user input. In the present embodiment, peripheral control nodes 704, 705, and 706 receive this new master value.

Alternatively, the master control node 701 may send the new master value only to those control nodes that are currently set to the system being altered in a multiple system environment. For example, when the user alters the temperature function 712 of the heating system 709, the master control node 701 automatically sends the new master value for the temperature function 712 only to those peripheral control nodes not receiving user input that are also set to the heating system 709.

In another embodiment, the peripheral control nodes that are not set to the heating system 709 may query the master control node to receive the new master value when subsequently set to the heating system 709.

The output signal containing the new master value for the temperature function 712 generated by the master control node 701 is configured to generate a haptic effect on a second control node receiving the output signal wherein the haptic effect is based at least in part on the input signal originating from the first control node 703. A second control node can comprise one or a plurality of peripheral control nodes capable of providing haptic feedback to a user. In the multiple single function environment of FIG. 7, for example, a second control node can comprise peripheral control node 704.

In embodiments where the master control node 701 transmits the output signal to. a second peripheral control node not receiving user input regardless of the second control node's functional status, the second peripheral control node is altered to haptically reflect the current status of the temperature 712 function when set to the temperature function 712. When a user turns the dial of peripheral control node 703 to the maximum stop to increase the temperature of the temperature function 712, a first input signal is generated at control node 703 and sent to the master control node 701. The first input signal sent to the master control node contains information that peripheral control node 703 is at the maximum stop. The subsequent output signal generated by the master control node 701 and sent to a second peripheral control node 704 contains information consistent with that of the first input signal indicating that first control node 703 is at the maximum stop. The output signal causes second control node 704 to haptically reflect the maximum stop position when set to the temperature function 712.

The dial of second peripheral control node 704 in the embodiment shown does not physically move to the maximum stop position upon receiving the output signal from the master control node 701. Instead, the haptic workspace around the dial is altered to reflect the maximum stop position. Software controlled actuators responsible for producing the haptic cues of the dial alter the haptic workspace of second peripheral control node 704 allowing it to reflect the maximum stop position. As a result, when a user subsequently interfaces with second control node 704 to further alter the temperature function 712 of the heating system 709, the dial of control node 704 is at the maximum stop, which is consistent with the haptic position of the dial of control node 703.

In embodiments where the master control node sends the output signal only to those control nodes currently set to the function being altered in a multiple function system, a second peripheral control node 704 receiving the output signal is altered to haptically reflect the current status of the temperature function 712. The second peripheral control node of the present embodiment is altered in a manner consistent with that described in relation to FIGS. 1 and 3.

In embodiments in which a peripheral control node may query the master control node to receive the new master value for the altered function, a second input signal can be generated at a second control node when a user sets the second control node to the altered function. A user may depress the dial of second peripheral control node 704 to toggle from the light 710 function of the lighting system 707 or the volume 711 function of the audio system 708 to select the temperature function 712 of the heating system 709. In other embodiments the function or functions of systems may be selected in some other manner such as a touch pad, touchscreen, or similar device. When the second peripheral control node is set to the temperature 712 function, a second input signal is generated. The second input signal comprises a query requesting that the master control node 701 update the second control node 704 with the current master value for the temperature function 712 of the heating system 709.

The second input signal is transmitted to the master control node 701. The master control node 701 receives and registers this second input signal. After receipt of this second input signal, the master control node 701 transmits the output signal to second control node 704. The output signal contains the new master value for the temperature function 712. The output signal is configured to produce a haptic effect on second control node 704 that is based at least in part on the first input signal originating at first control node 703.

In the embodiment shown, the dial of peripheral control node 704 does not physically move to the maximum stop position upon receiving the output signal from the master control node 701. Instead, the haptic workspace around the dial is altered to reflect the maximum stop position. Software controlled actuators responsible for producing the haptic cues of the dial alter the haptic workspace of peripheral control node 704 allowing it to reflect the maximum stop position. As a result, when a user subsequently interfaces with second control node 704 to further alter the temperature function 712 of the heating system 709, the dial of control node 704 is at the maximum stop, which is consistent with the haptic position of the dial of control node 703.

These embodiments of the present invention allow a user to determine the functional status of a system in a multiple system environment through the haptic feedback of synchronized peripheral control nodes. Furthermore, the method of synchronizing the peripheral control nodes is substantially the same when a user alters more than one system in a multiple system environment.

Figure 8:
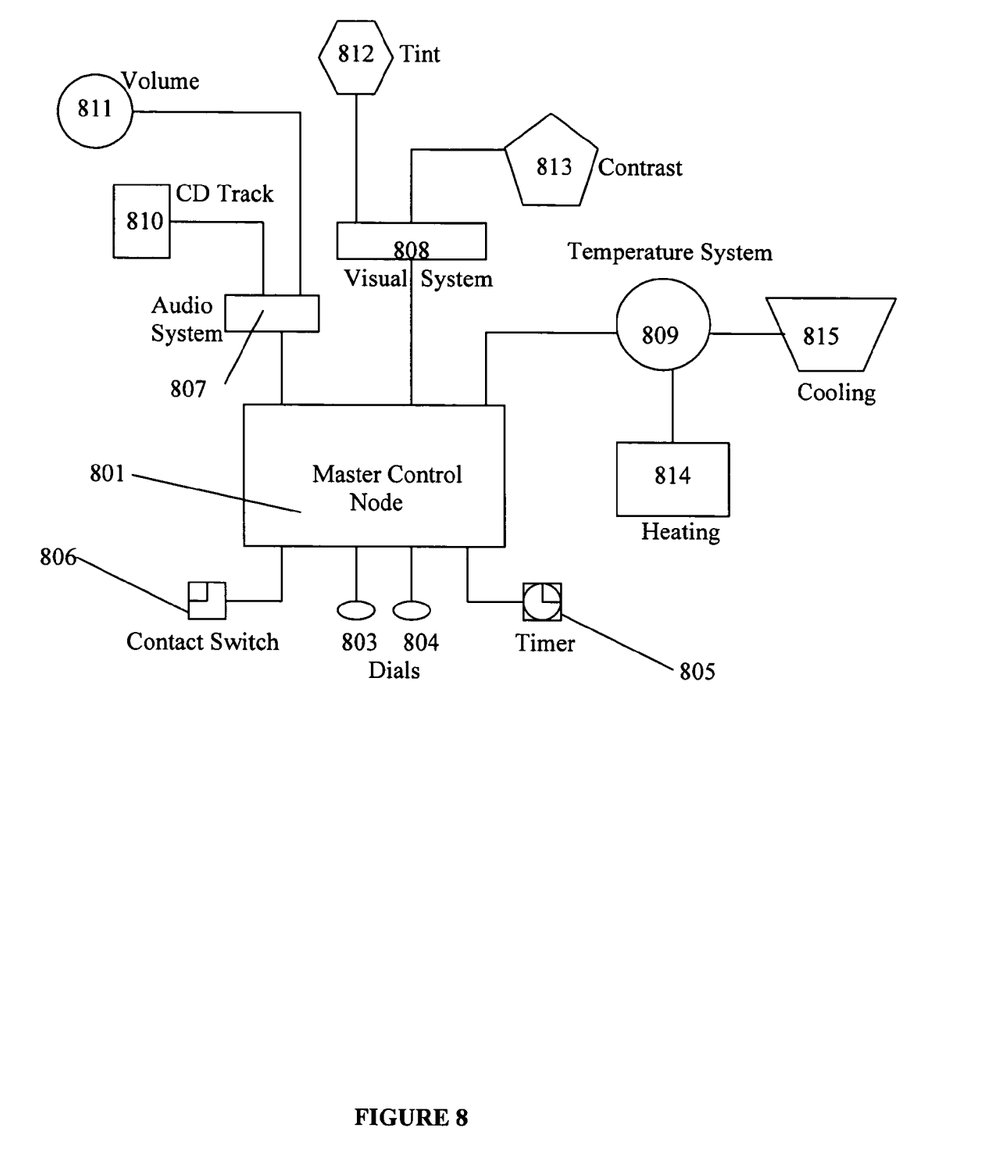
FIG. 8 is an illustration of an environment for implementation of a still further embodiment of the present invention.

FIG. 8 is an illustration of a system environment for the implementation of a still further embodiment of the present invention. The environment displayed comprises an audio system 807 with CD track 810 and volume 811 functions, a visual system 808 with tint 812 and contrast 813 functions, and a temperature system 809 with heat 814 and cooling 815 functions. In further embodiments, the environment of FIG. 8 can be a plurality of independent systems with each system comprising multiple functions.

Peripheral control nodes 803, 804, 805, 806 comprise devices for controlling the multiple functions of the audio 807, visual 808, and temperature 809 systems. The devices comprising these control nodes are consistent with those described in the preceding embodiments of FIGS. 1, 3, and 7. The peripheral control nodes 803, 804, 805, 806 are placed at different positions around the systems allowing a user a variety of locations from which to control the systems.

The audio 807, visual 808, and temperature 809 systems along with the peripheral control nodes 803, 804, 805, 806 are connected to a master control node 801. The master control node 801 comprises a device capable of receiving and generating signals for communication with the audio 807, visual 808, and temperature systems 809 and peripheral control nodes 803, 804, 805, 806. The master control node 801 receives user input signals from peripheral control nodes 803, 804, 805, 806 and subsequently outputs signals configured to generate haptic feedback at the peripheral control nodes 803, 804, 805, 806. Devices suitable for a master control node 801 can comprise any device that includes a processor, including a computer, dedicated controller, or any other processor equipped device. The characteristics and capabilities of these devices are similar to the devices suitable for serving as the master control node in the preceding lighting system embodiment of FIG. 1.

In the embodiment shown in FIG. 8, the method of utilizing a peripheral control node to select a system and alter one of its multiple functions is similar to the method described in the preceding embodiment of FIG. 7 with reference to the flowcharts of FIGS. 4, 5, and 6. Moreover, the master control node 801 follows similar steps in receiving input signals and generating an output signal configured to produce a haptic effect on a second peripheral control node.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. An apparatus comprising:
a first master control node operable to:
receive a first input signal from a first control node, the first input signal associated with a state of the first control node and associated with a state of a system to be controlled;
control the system based at least in part on the first input signal; and
generate a first output signal configured to produce a first haptic effect on a second control node, the first haptic effect based at least in part on the first input signal.

2. The apparatus of claim 1, wherein the first master control node comprises a processor.

3. The apparatus of claim 1, wherein the first control node comprises a processor.

4. The apparatus of claim 1, wherein the second control node comprises a processor.

5. The apparatus of claim 1, wherein the first control node and the second control node are operable to control at least a single function of the system.

6. The apparatus of claim 5, wherein the single function is one of a plurality of functions within the system.

7. The apparatus of claim 1, wherein the first control node and the second control node comprises a manipulandum.

8. The apparatus of claim 7, wherein the manipulandum comprises at least one of a switch, a slider, a dial, and a rotary handle.

9. The apparatus of claim 1, further comprising receiving a second input signal from the second control node, the second input signal associated with a state of the second control node and associated with a state of a system to be controlled.

10. The apparatus of claim 9, wherein the first haptic effect is further based at least in part on the second input signal.

11. The apparatus of claim 1, further comprising a second master control node in communication with the first master control node wherein the second master control node is operable to receive the first output signal.

12. The apparatus of claim 11, wherein the second master control node is operable to generate a second output signal configured to produce a second haptic effect on a third control node, the second haptic effect based at least in part on the first output signal.

13. An apparatus comprising:
a first control node comprising a sensor; and
a second control node,
wherein the sensor is operable to sense an input at the first control node and generate an output signal configured to control a system, the output signal further configured to produce a haptic effect on the second control node, the haptic effect based at least in part on the input at the first control node.

14. The apparatus of claim 13, wherein the first control node further comprises a processor.

15. The apparatus of claim 13, wherein the second control node comprises a processor.

16. The apparatus of claim 13, wherein the first control node and the second control node are operable to control at least a single function of the system.

17. An apparatus comprising:
a first control node operable to generate an input signal associated with a state of the first control node and associated with a state of a system to be controlled, the input signal configured to cause a master control node to control the system, the input signal further configured to cause a master control node to generate an output signal, wherein the output signal is configured to produce a haptic effect on a second control node, the haptic effect based at least in part on the input signal.

18. The apparatus of claim 17, wherein the first control node comprises a processor.

19. The apparatus of claim 17, wherein the first control node and second control node are operable to control at least a single function of the system.

20. The apparatus of claim 19, wherein the single function is one of a plurality of functions within the system.

21. A method comprising:
receiving a first input signal from a first control node, the first input signal associated with a state of the first control node and a state of a system to be controlled;
controlling the system based at least in part on the first input signal; and
generating an output signal configured to produce a haptic effect on a second control node, the haptic effect based at least in part on the first input signal.

22. The method of claim 21, wherein receiving the first input signal from the first control node comprises receiving the first input signal at a master control node.

23. The method of claim 22, wherein generating the output signal comprises generating the output signal at the master control node.

24. The method of claim 23, wherein the master control node comprises a processor.

25. The method of claim 21, further comprising
receiving a second input signal from the second control node, the second input signal associated with a state of the second control node and a state of the system to be controlled.

26. The method of claim 25, wherein receiving the first input signal from the first control node comprises receiving the first input signal at a master control node and receiving the second input signal from the second control node comprises receiving the second input signal at the master control node.

27. The method of claim 25, wherein the haptic effect is further based at least in part on the second input signal.

28. A computer-readable medium on which is encoded program code, the program code comprising:
   program code for receiving a first input signal from a first control node, the first input signal associated with a state of the first control node and a state of a system to be controlled;
   program code for controlling the system based at least in part on the first input signal; and
   program code for generating an output signal configured to produce a haptic effect on a second control node, the haptic effect based at least in part on the first input signal.

29. The computer readable medium of claim 28, wherein the program code for receiving the first input signal from the first control node comprises program code for receiving the first input signal at a master control node.

30. The computer readable medium of claim 29, wherein the program code for generating the output signal comprises program code for generating the output signal by the master control node.

31. The computer-readable medium of claim 29, further comprising
   program code for receiving a second input signal from the second control node, the second input signal associated with a state of the second control node and a state of the system to be controlled.

32. The computer-readable medium of claim 31, wherein the program code for receiving the first input signal from the first control node and the program code for receiving the second input signal from the second control node comprises program code for receiving the first input signal at a master control node and program code for receiving the second input signal at the master control node.

33. The computer readable medium of claim 32, wherein program code for generating the output signal comprises program code for generating the output signal by the master control node.

* * * * *